United States Patent
Lee et al.

(10) Patent No.: US 8,805,315 B2
(45) Date of Patent: Aug. 12, 2014

(54) APPARATUS AND METHOD FOR ADAPTIVE WHITENING IN A MULTIPLE ANTENNA SYSTEM

(71) Applicant: Samsung Electronics Co., Ltd., Gyeonggi-do (KR)

(72) Inventors: Ik-Beom Lee, Gyeonggi-do (KR); Sung-Kwon Jo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 15 days.

(21) Appl. No.: 13/631,052

(22) Filed: Sep. 28, 2012

(65) Prior Publication Data

US 2013/0022160 A1    Jan. 24, 2013

Related U.S. Application Data

(62) Division of application No. 12/704,281, filed on Feb. 11, 2010, now Pat. No. 8,280,332.

(30) Foreign Application Priority Data

Feb. 10, 2009 (KR) .................. 10-2009-0010464

(51) Int. Cl.
*H04B 1/00* (2006.01)

(52) U.S. Cl.
USPC ........ 455/296; 455/501; 455/63.1; 455/278.1

(58) Field of Classification Search
CPC ...... H04B 7/0857; H04B 1/00; H04B 1/1027; H04B 7/0854
USPC .............................. 455/501, 63.1, 296, 278.1
See application file for complete search history.

(56) References Cited

U.S. PATENT DOCUMENTS

| | | |
|---|---|---|
| 2003/0203723 A1 | 10/2003 | Persson et al. |
| 2004/0042532 A1 | 3/2004 | Artamo et al. |
| 2007/0072551 A1* | 3/2007 | Pajukoski et al. ............ 455/63.1 |
| 2007/0080855 A1 | 4/2007 | Gerlach et al. |
| 2012/0083261 A1* | 4/2012 | Hui et al. .................. 455/422.1 |

* cited by examiner

*Primary Examiner* — Tuan Pham
(74) *Attorney, Agent, or Firm* — The Farrell Law Firm, P.C.

(57) ABSTRACT

An apparatus and method for controlling a whitening function of a whitening Maximum Ratio Combining (MRC) in a receive end of a multiple antenna system are provided. The method includes identifying if there is interference from at least one neighbor cell, if there is interference, generating a weight of the whitening MRC using a pre-whitening inverse matrix, and, if there is no interference, generating a weight of the whitening MRC using a unit matrix, thus being capable of improving a reception performance of the receive end.

10 Claims, 6 Drawing Sheets

US 8,805,315 B2

APPARATUS AND METHOD FOR ADAPTIVE WHITENING IN A MULTIPLE ANTENNA SYSTEM

PRIORITY

This application is a Divisional Application of U.S. patent application Ser. No. 12/704,281 filed in the U.S. Patent and Trademark Office on Feb. 11, 2010 and claims priority under 35 U.S.C. §119(a) to a Korean Patent Application filed in the Korean Intellectual Property Office on Feb. 10, 2009 and assigned Serial No. 10-2009-0010464, the contents of each of which are incorporated herein by reference.

BACKGROUND OF THE INVENTION

1. Field of the Invention

The present invention relates to a pre-whitening filter of a receive end in a multiple antenna system. More particularly, the present invention relates to an apparatus and method for selectively using a Minimum Mean Square Error (MMSE) scheme or a Maximum Ratio Combining (MRC) scheme depending on the existence or absence of inter-cell interference in a receive end of a multiple antenna system.

2. Description of the Related Art

With a rapid growth of the wireless mobile communication market, there is an increase in the demand for diversity of multimedia services in the wireless environment. Accordingly, as a large capacity of transmission data and a high speed of data transmission are implemented to provide multimedia services, extensive research of multiple antenna systems capable of efficiently using limited frequency resources is being conducted.

The multiple antenna system can increase transmission reliability and data rate compared to a single antenna system without additional frequency or transmission power allocation through data transmission using an independent channel.

The typical receiving method used in the multiple antenna system can be an MMSE scheme and an MRC scheme. In the environment in which there is inter-cell interference, an MMSE receive end has more excellent reception performance than an MRC receive end. However, when there is no inter-cell interference, the MMSE receive end exhibits a lesser reception performance than the MRC receive end. For example, when there is no inter-cell interference, the MMSE receive end has poor reception performance because off-diagonal elements do not converge to '0' at the time when the $R_{nn}^{-1}$ calculation necessary for MMSE weight calculation is performed.

Thus, a receive end of a multiple antenna system needs a method for selectively using an MMSE scheme or an MRC scheme depending on the existence or absence of inter-cell interference to improve reception performance.

SUMMARY OF THE INVENTION

The present invention substantially solves at least the above problems and/or disadvantages and provides at least the advantages below. Accordingly, one aspect of the present invention is to provide an apparatus and method for selectively using a Minimum Mean Square Error (MMSE) scheme or a Maximum Ratio Combining (MRC) scheme depending on the existence or absence of interference in a receive end of a multiple antenna system.

Another aspect of the present invention is to provide an apparatus and method for controlling a whitening function of a whitening MRC depending on the existence or absence of interference in a receive end of a multiple antenna system.

A further aspect of the present invention is to provide an apparatus and method for controlling a whitening function of a whitening MRC depending on a Carrier to Interference plus Noise Ratio (CINR) in a receive end of a multiple antenna system.

The above aspects are achieved by providing an apparatus and method for adaptive whitening in a multiple antenna system.

According to one aspect of the present invention, a method for controlling a whitening function of a whitening Maximum Ratio Combining (MRC) in a receive end of a multiple antenna system is provided. The method includes identifying if there is an influence of interference from at least one neighbor cell, if there is the influence of interference, generating a weight of the whitening MRC using a pre-whitening inverse matrix, and, if there is no influence of interference, generating a weight of the whitening MRC using a unit matrix.

According to another aspect of the present invention, a method for controlling a whitening function of a whitening MRC in a receive end of a multiple antenna system is provided. The method includes identifying if there is an influence of interference from at least one neighbor cell, setting an update variable for a covariance matrix of noise plus interference in consideration the influence of interference, calculating a covariance matrix of noise plus interference, updating the covariance matrix of noise plus interference using the update variable, calculating a pre-whitening inverse matrix using the updated covariance matrix of noise plus interference, and generating a weight of the whitening MRC using the pre-whitening inverse matrix.

According to a further aspect of the present invention, an apparatus for controlling a whitening function of a whitening MRC in a receive end of a multiple antenna system is provided. The apparatus includes at least one antenna, an interference identifier, a filter controller, and a pre-whitening filter. The interference identifier identifies if there is an influence of interference from at least one neighbor cell, using a signal received through the at least one antenna. If there is an influence of interference, the filter controller provides a pre-whitening inverse matrix to the pre-whitening filter and, if there is no influence of interference, the filter controller provides a unit matrix to the pre-whitening filter. The pre-whitening filter generates a weight of the whitening MRC using the pre-whitening inverse matrix or unit matrix provided from the filter controller.

According to a yet another aspect of the present invention, an apparatus for controlling a whitening function of a whitening MRC in a receive end of a multiple antenna system is provided. The apparatus includes at least one antenna, an interference identifier, a filter controller, and a pre-whitening filter. The interference identifier identifies if there is an influence of interference from at least one neighbor cell using a signal received through the at least one antenna. The filter controller updates a covariance matrix of noise plus interference using an update variable for a covariance matrix of noise plus interference that is set considering an influence of interference, and transmits a pre-whitening inverse matrix, which is calculated using the updated covariance matrix, to the pre-whitening filter. The pre-whitening filter generates a weight of the whitening MRC using the pre-whitening inverse matrix provided from the filter controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
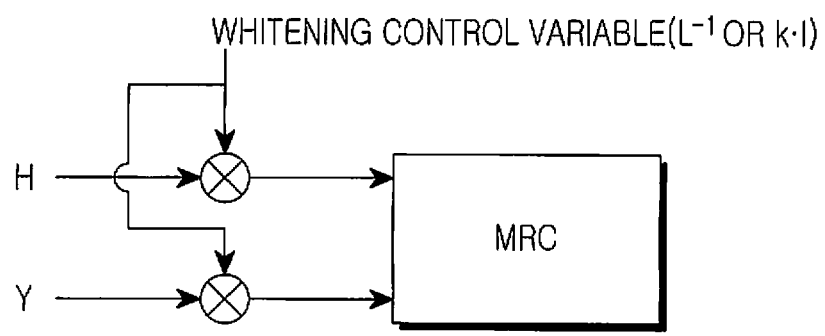
FIG. 1 is a block diagram illustrating whitening Maximum Ratio Combining (MRC) according to the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

A technology for selectively using a Minimum Mean Square Error (MMSE) scheme or a Maximum Ratio Combining (MRC) scheme depending on the existence or absence of inter-cell interference in a receive end of a multiple antenna system is described below.

In the following description, it is assumed that the receive end includes $N_R$ antennas. Here, the '$N_R$' represents an integer of '1' or more.

Also, in the following description, it is assumed that the multiple antenna system uses an Orthogonal Frequency Division Multiplexing (OFDM) scheme. However, the present invention is applicable even when the multiple antenna system uses other communication schemes.

When there is inter-cell interference, the receive end receives a signal that can be represented as in Equation (1). Here, Equation (1) represents a receive signal converted into a frequency domain signal through Fast Fourier Transform (FFT).

$$Y = HX + H_I I + N \tag{1}$$

In Equation (1), 'Y' represents a signal received at a receive end, 'H' represents a channel between a transmit end and the receive end, 'X' represents a signal transmitted at the transmit end, '$H_I$' represents an interference channel between a different transmit end having the influence of interference and the receive end, T represents a neighbor cell interference signal, and 'N' represents a thermal noise.

When the receive end uses an MMSE scheme, the receive end generates an MMSE weight based on Equation (2).

$$W = E[xy^H]E[yy^H]^{-1} = H^H R^{-1}_{yy} = H^H R^{-1}_{nn} \tag{2}$$

In Equation (2), 'W' represents an MMSE weight, 'y' represents a receive signal, 'H' represents a channel between a transmit end and a receive end, and '$R_{nn}$' represents a covariance matrix of noise plus interference. Here, '$H^H R^{-1}_{yy} = H^H R^{-1}_{nn}$' can be proved by applying a matrix inversion theorem.

The covariance matrix ($R_{nn}$) of Equation (2) can be given using Cholesky Factorization as in Equation (3).

$$R_{nn} = E[nn] = LL^H \tag{3}$$

In Equation (3), '$R_{nn}$' represents a covariance matrix of noise plus interference, 'n' represents the sum of noise and interference, and 'L' represents a pre-whitening inverse matrix.

By applying Equation (3) to Equation (2), the MMSE weight can be expressed in Equation (4).

$$W = H^H R^{-1}_{nn} H = H^H (LL^H)^{-1} = (L^{-1}H)^H (L)^{-1} \tag{4}$$

In Equation (4), 'W' represents an MMSE weight, 'H' represents a channel between a transmit end and a receive end, '$R_{nn}$' represents a covariance matrix of noise plus interference, and 'L' represents a pre-whitening inverse matrix.

When the receive end uses an MRC scheme, the receive end generates an MRC weight given in Equation (5).

$$W_{MRC} = H^H \tag{5}$$

In Equation (5), '$W_{MRC}$' represents an MRC weight, and 'H' represents a channel between a transmit end and a receive end.

In a comparison between Equations (4) and (5), the MMSE weight and MRC weight have a difference of application/non-application of a pre-whitening inverse matrix (L). Accordingly, as illustrated in FIG. 1 the receive end can selectively use an MMSE scheme or an MRC scheme by controlling the pre-whitening inverse matrix (L) of a whitening MRC depending on the existence or absence of interference. Here, the whitening MRC represents a reception scheme designed to exhibit the reception performance of the MMSE scheme using an MRC.

FIG. 1 is a block diagram illustrating whitening MRC according to the present invention.

As illustrated in FIG. 1, the whitening MRC multiplies a weight by a pre whitening inverse matrix (L) to receive the same signal as that of an MMSE scheme. At this time, a receive end selectively provides the pre-whitening inverse matrix (L) depending on the existence or absence of interference and turns ON/OFF a whitening function of the whitening MRC. For example, when there is inter-cell interference, the receive end provides the pre-whitening inverse matrix (L). Accordingly, the receive end can generate an MMSE weight given in Equation (4) and receive the same signal as that of the MMSE scheme. As another example, when there is no inter-cell interference, the receive end provides a unit matrix (k·I), not the pre-whitening inverse matrix (L). Accordingly, the receive end can generate an MRC weight given in Equation (5) and receive the same signal as that of an MRC scheme.

The following description is that of a receive end for selectively providing a pre-whitening inverse matrix depending on the existence or absence of interference.

Figure 2:
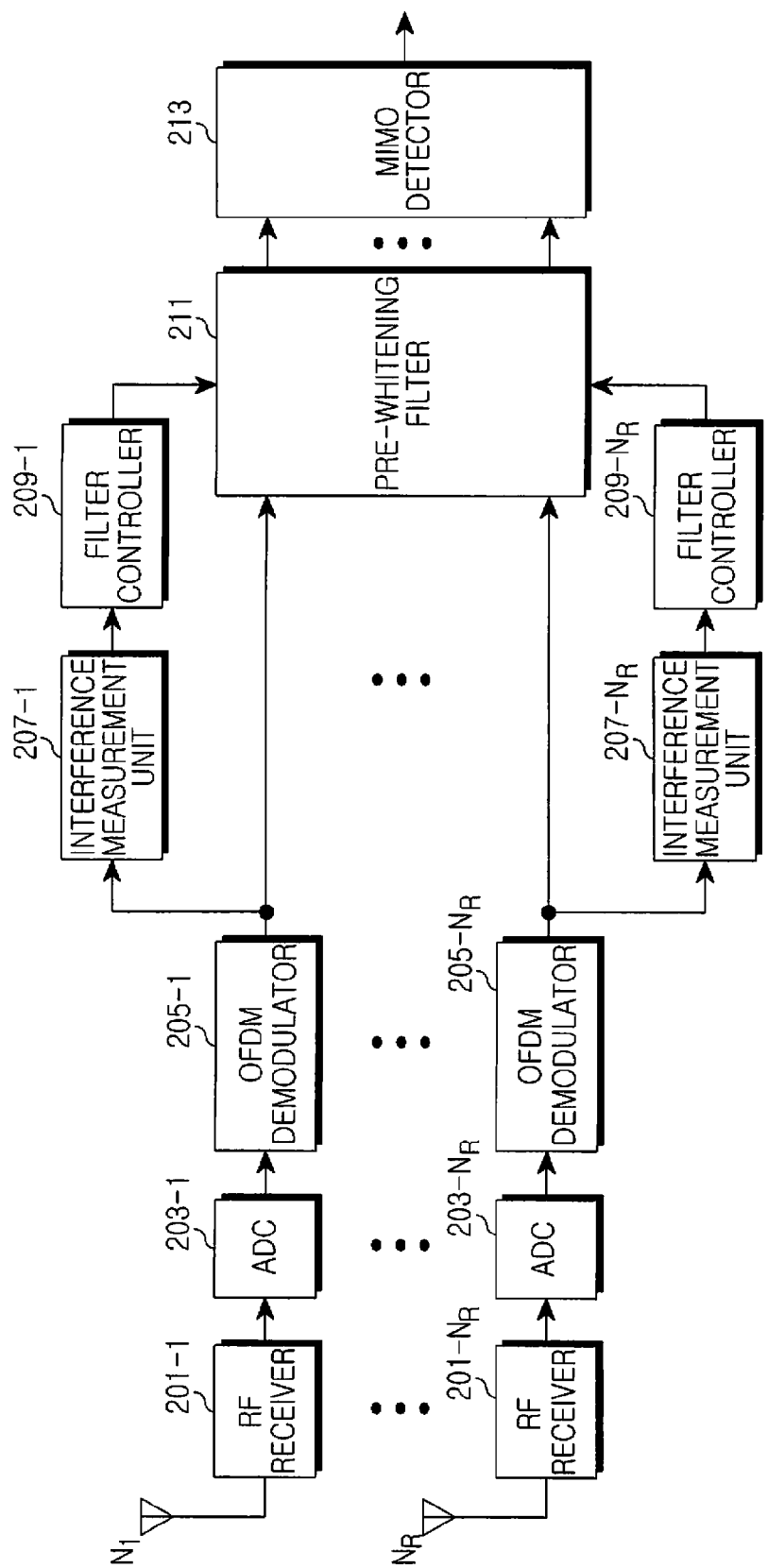
FIG. 2 is a block diagram illustrating a receive end in a multiple antenna system according to the present invention.

FIG. 2 is a block diagram illustrating a receive end in a multiple antenna system according to the present invention.

As illustrated in FIG. 2, the receive end includes a plurality of Radio Frequency (RF) receivers 201-1 to 201-$N_R$, a plurality of Analog to Digital Converters (ADCs) 203-1 to 203-$N_R$, a plurality of OFDM demodulators 205-1 to 205-$N_R$, a plurality of interference measurement units 207-1 to 207-$N_R$, a plurality of filter controllers 209-1 to 209-$N_R$, a pre-whitening filter 211, and a Multiple Input Multiple Output (MIMO) detector 213.

The RF receivers 201-1 to 201-$N_R$ convert signals received through antennas ($N_1$ to $N_R$) into baseband signals.

The ADCs 203-1 to 203-$N_R$ convert analog signals provided from the respective RF receivers 201-1 to 201-$N_R$ into digital signals.

The OFDM demodulators 205-1 to 205-$N_R$ convert time domain signals provided from the respective ADCs 203-1 to 203-$N_R$ into frequency domain signals through a Fast Fourier Transform (FFT) operation.

The interference measurement units 207-1 to 207-$N_R$ measure interference power in signals provided from the respective OFDM demodulators 205-1 to 205-$N_R$. For example, the interference measurement units 207-1 to 207-$N_R$ measure power of a combination of noise and interference using pilot signals. The interference measurement units 207-1 to 207-$N_R$ measure power of unused tones. If the interference measurement units 207-1 to 207-$N_R$ recognize the sum of the power of the unused tones as thermal noise, the interference measurement units 207-1 to 207-$N_R$ remove the thermal noise from the power of combination of noise and interference and measure interference power.

As another example, when measuring covariance matrices ($R_{nn}$) of noise plus interference in a burst, the interference measurement units 207-1 to 207-$N_R$ can also measure interference power in the burst.

As a further example, in the case of an Adaptive Modulation and Coding (AMC) sub-channel structure, the interference measurement units 207-1 to 207-$N_R$ can also measure interference power in a band.

The filter controllers 209-1 to 209-$N_R$ determine if there is interference depending on interference power provided from the respective interference measurement units 207-1 to 207-$N_R$, and select pre-whitening inverse matrices (L). For example, when there is interference, the filter controllers 209-1 to 209-$N_R$ select and provide pre-whitening inverse matrices (L) to the pre-whitening filter 211. As another example, when there is no interference, the filter controllers 209-1 to 209-$N_R$ select and provide unit matrices (k·I) to the pre-whitening filter 211.

The pre-whitening filter 211 filters out interference from receive signals provided from the OFDM demodulators 205-1 to 205-$N_R$. The pre-whitening filter 211 is included in a whitening MRC. Accordingly, when receiving pre-whitening inverse matrices (L) from the filter controllers 209-1 to 209-$N_R$, the pre-whitening filter 211 generates an MMSE weight given in Equation (4) and receives a signal in an MMSE scheme. On the other hand, when receiving unit matrices (k·I) from the filter controllers 209-1 to 209-$N_R$, the pre-whitening filter 211 generates an MRC weight given in Equation (5) and receives a signal in an MRC scheme.

The MIMO detector 213 determines a transmit signal using a receive signal from which interference is filtered out by the pre-whitening filter 211 and channel information.

The following description is a method for controlling a whitening function depending on the existence or absence of interference that is identified using interference power.

Figure 3:
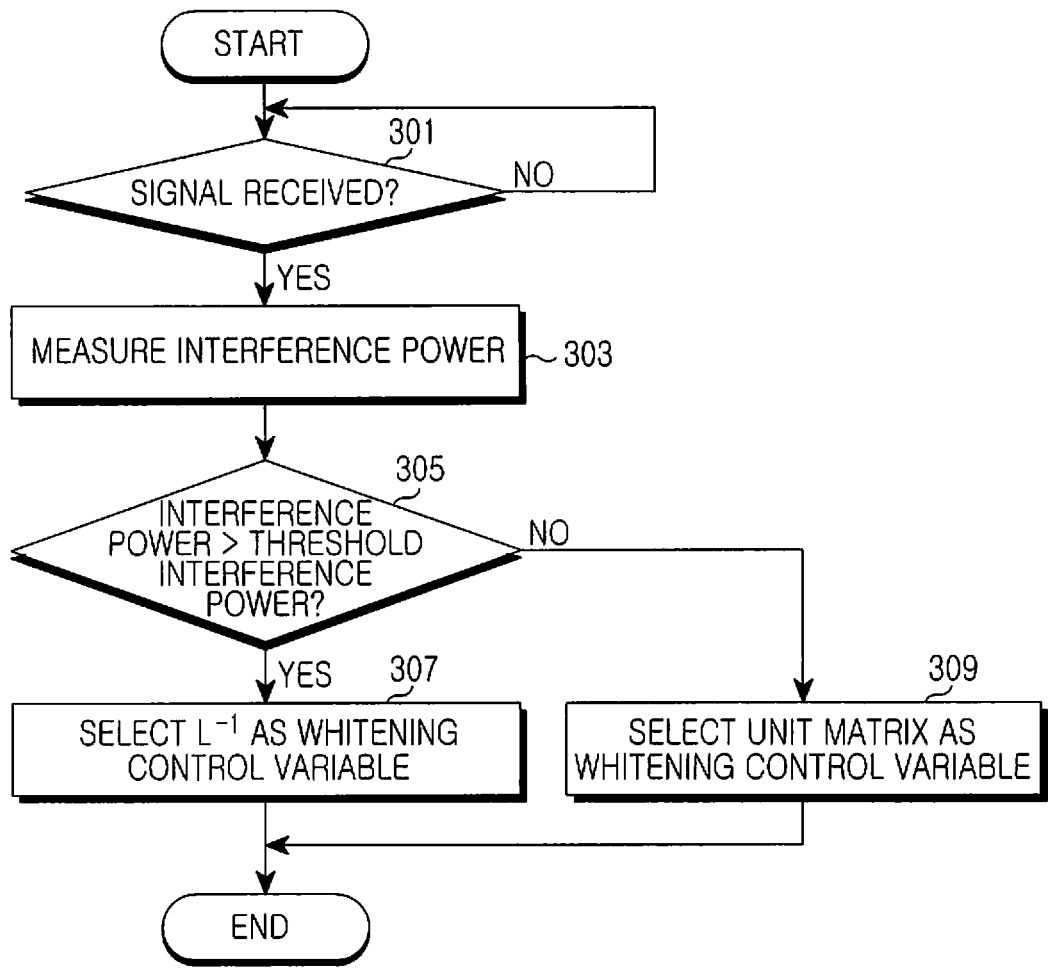
FIG. 3 is a flow diagram illustrating controlling a whitening function depending on an interference amount in a receive end according to an embodiment of the present invention.

FIG. 3 is a flow diagram illustrating controlling a whitening function depending on an interference amount in a receive end according to an embodiment of the present invention.

Referring to FIG. 3, in step 301, the receive end identifies if a signal is received from a transmit end.

If the signal is received from the transmit end, in step 303, the receive end measures power of interference included in the receive signal. For example, the receive end measures power of a combination of noise and interference using a pilot signal included in the receive signal. Also, the receive end sums up power of unused tones and recognizes the summed power as a thermal noise. After that, the receive end removes thermal noise from the power of the combination of noise and interference, and measures interference power.

After measuring the interference power, the receive end proceeds to step 305 and compares the interference power measured in step 303 to a threshold interference power so as to determine if there is interference.

If the interference power measured in step 303 is greater than the threshold interference power, the receive end recognizes that there is interference. Accordingly, the receive end proceeds to step 307 and selects a pre-whitening inverse matrix (L) as a whitening control variable. In this case, the receive end turns ON a whitening function of a whitening MRC and receives a signal in an MMSE scheme.

On the other hand, if the interference power measured in step 303 is less than or equal to the threshold interference power, the receive end recognizes that there is no interference. Accordingly, the receive end proceeds to step 309 and selects a unit matrix (k·I) as the whitening control variable. In this case, the receive end turns OFF the whitening function of the whitening MRC and receives a signal in an MRC scheme.

After that, the receive end terminates the procedure according to the embodiment of the present invention.

In the aforementioned embodiment, a receive end selectively provides a pre-whitening inverse matrix depending on the existence or absence of interference.

In another embodiment, a receive end can also control an $R_{nn}$ update variable and turn ON/OFF a whitening function of a whitening MRC. For example, the receive end converts an '$R_{nn}$' into an '$LL^H$' form through Cholesky Factorization as given in Equation (3). Before carrying out Cholesky Factorization of the '$R_{nn}$', the receive end updates the '$R_{nn}$' as given in Equation (6).

$$R_{nn}^{NEW} = R_{nn} + k \cdot I \qquad (6)$$

In Equation (6), '$R_{nn}^{NEW}$' represents an updated $R_{nn}$, '$R_{nn}$' represents a covariance matrix of noise plus interference, 'k' represents an $R_{nn}$ update variable, and 'I' represents a unit matrix.

As in Equation (6), the receive end updates '$R_{nn}$' before generating a pre-whitening inverse matrix (L) through Cholesky Factorization of '$R_{nn}$'. At this time, the receive end can turn ON/OFF the whitening function of the whitening MRC depending on 'k'. For example, when there is inter-cell interference, the receive end sets 'k' down and does not vary '$R_{nn}$'. As another example, when there is no inter-cell interference, the receive end sets 'k' up. In this case, diagonal elements of 'hd nn' are relatively greater than off-diagonal elements and thus '$R_{nn}$' approaches a unit matrix. When the '$R_{nn}$' is a unit matrix, even the pre-whitening inverse matrix (L) becomes a unit matrix and thus, the whitening function can turn OFF.

Accordingly, the filter controllers 209-1 to 209-$N_R$ of FIG. 2 can determine an update variable for a covariance matrix ($R_{nn}$) of noise plus interference in consideration of the influence of interference. The filter controllers 209-1 to 209-$N_R$ calculate pre-whitening inverse matrices (L) using the '$R_{nn}$' updated using the update variable, and transmit the calculated pre-whitening inverse matrices (L) to the pre-whitening filter 211.

The following description is made for a method for controlling an $R_{nn}$ update variable and turning ON/OFF a whitening function of a whitening MRC in a receive end.

Figure 4:
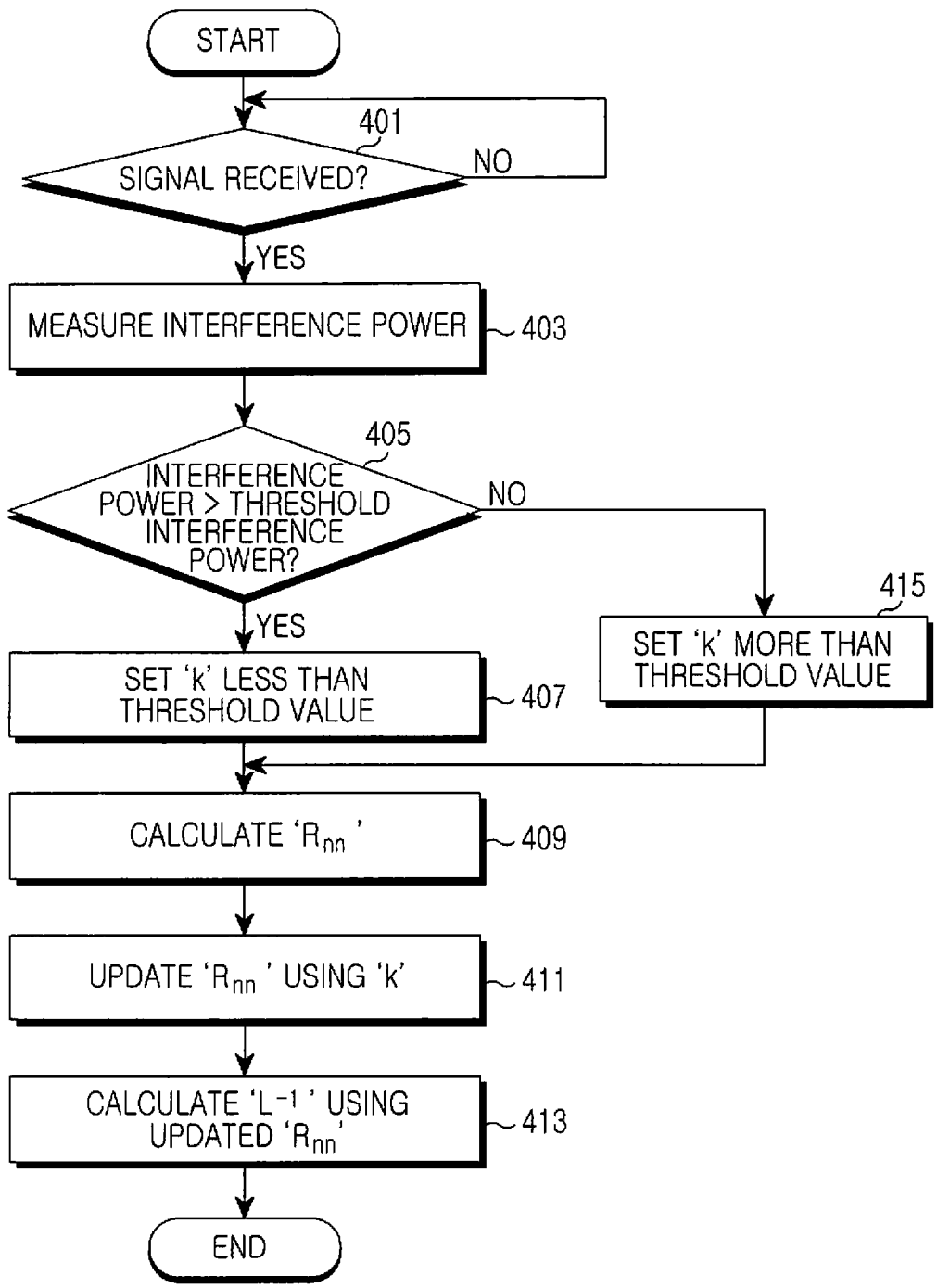
FIG. 4 is a flow diagram illustrating controlling a whitening function depending on an interference amount in a receive end according to another embodiment of the present invention.

FIG. 4 is a flow diagram illustrating controlling a whitening function depending on an interference amount in a receive end according to another embodiment of the present invention.

Referring to FIG. 4, in step 401, the receive end identifies if a signal is received from a transmit end.

If the signal is received from the transmit end, in step 403, the receive end measures power of interference included in the receive signal. For example, the receive end measures power of a combination of noise and interference, using a pilot signal included in the receive signal. Also, the receive end sums up power of unused tones and recognizes the summed power as thermal noise. The receive end then removes the thermal noise from the power of combination of noise and interference, and measures interference power.

After measuring the interference power, the receive end proceeds to step 405 and compares the interference power measured in step 403 with a threshold interference power in order to determine if there is interference.

If the interference power measured in step 403 is greater than the threshold interference power, the receive end recognizes that there is interference. Accordingly, the receive end proceeds to step 407 and sets an $R_{nn}$ update variable (k) to a value less than a threshold value. Here, the threshold value includes a value for determining if a covariance matrix ($R_{nn}$) is varied through the $R_{nn}$ update variable (k).

Then, the receive end proceeds to step 409 and calculates a covariance matrix ($R_{nn}$) of noise plus interference.

On the other hand, if the interference power measured in step 403 is less than or equal to the threshold interference power, the receive end recognizes that there is no interference. Accordingly, the receive end proceeds to step 415 and sets the $R_{nn}$ update variable (k) to a value greater than the threshold value.

Then, the receive end proceeds to step 409 and calculates a covariance matrix ($R_{nn}$) of noise plus interference.

After calculating the covariance matrix ($R_{nn}$) of noise plus interference, the receive end proceeds to step 411 and updates the covariance matrix ($R_{nn}$) using the $R_{nn}$ update variable (k) set in step 407 or 415. For example, the receive end updates the '$R_{nn}$' as given in Equation (6).

After updating $R_{nn}$, the receive end proceeds to step 413 and calculates a pre-whitening inverse matrix (L) through Cholesky Factorization of the $R_{nn}$ updated in step 411. For example, when there is no interference and thus the $R_{nn}$ update variable (k) is set to a value greater than the threshold value, the $R_{nn}$ approaches a unit matrix because diagonal elements of the $R_{nn}$ are relatively greater than off-diagonal elements. In this case, even the pre-whitening inverse matrix (L) becomes a unit matrix and thus, the receive end turns OFF a whitening function of a whitening MRC and receives a signal in an MRC scheme. As another example, when there is interference and thus the $R_{nn}$ update variable (k) is set to a value less than the threshold value, $R_{nn}$ does not vary. Accordingly, the receive end can turn ON the whitening function of the whitening MRC and receive a signal in an MMSE scheme.

After that, the receive end terminates the procedure according to the embodiment of the present invention.

In the aforementioned embodiment, a receive end determines if there is interference using interference power.

In another embodiment, a receive end can also determine if there is interference using a Carrier to Interference plus Noise Ratio (CINR).

The following description is a method for determining a pre-whitening control variable depending on the existence or absence of interference that is identified using a CINR.

Figure 5:
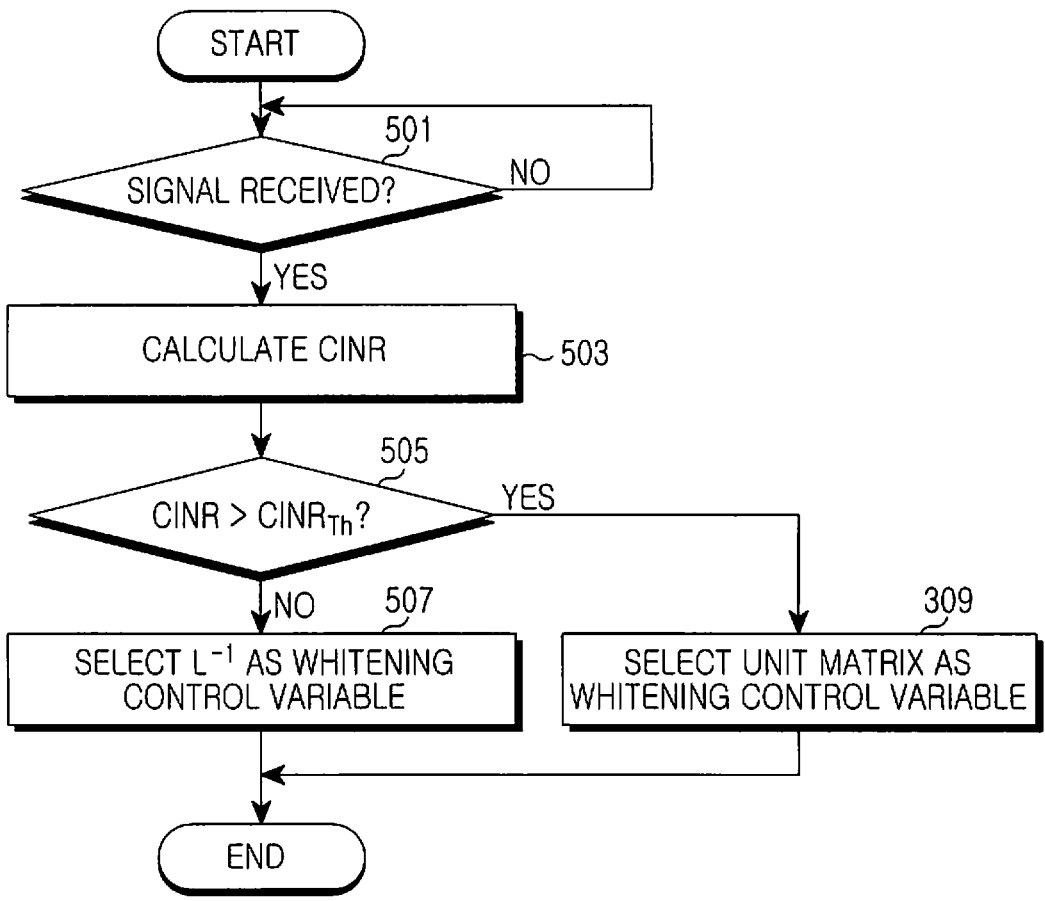
FIG. 5 is a flow diagram illustrating controlling a whitening function depending on a Carrier to Interference plus Noise Ratio (CINR) in a receive end according to an embodiment of the present invention.

FIG. 5 is a flow diagram illustrating controlling a whitening function depending on a CINR in a receive end according to an embodiment of the present invention.

Referring to FIG. 5, in step 501, the receive end identifies if a signal is received from a transmit end.

If the signal is received from the transmit end, in step 503, the receive end calculates a Carrier to Interference plus Noise Ratio (CINR) for the receive signal.

After measuring the CINR, the receive end proceeds to step 505 and compares the CINR calculated in step 503 with a threshold CINR ($CINR_{Th}$) in order to determine if there is interference.

If the CINR calculated in step 503 is less than or equal to the threshold CINR ($CINR_{Th}$), the receive end recognizes that there is interference. Accordingly, the receive end proceeds to step 507 and selects a pre-whitening inverse matrix (L) as a whitening control variable. In this case, the receive end turns ON a whitening function of a whitening MRC and receives a signal in an MMSE scheme.

On the other hand, if the CINR calculated in step 503 is greater than the threshold CINR ($CINR_{Th}$), the receive end recognizes that there is no interference. Accordingly, the receive end proceeds to step 509 and selects a unit matrix (k·I) as the whitening control variable. In this case, the receive end turns OFF the whitening function of the whitening MRC and receives a signal in an MRC scheme.

After that, the receive end terminates the procedure according to the embodiment of the present invention.

In the aforementioned embodiment, a receive end selectively provides a pre-whitening inverse matrix depending on the existence or absence of interference.

In another embodiment, a receive end can also control an $R_{nn}$ update variable and turn ON/OFF a whitening function of a whitening MRC.

Figure 6:
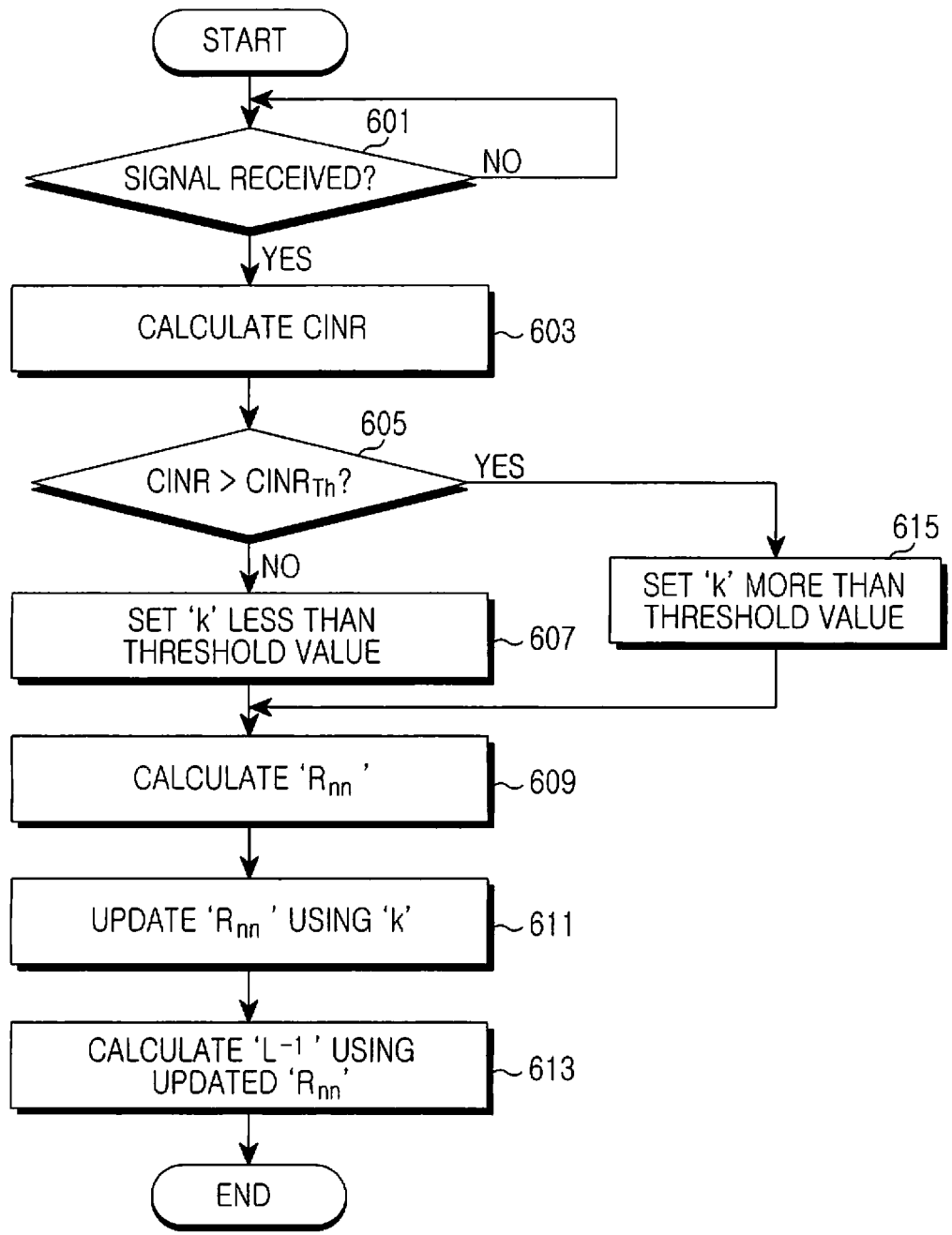
FIG. 6 is a flow diagram illustrating controlling a whitening function depending on a CINR in a receive end according to another embodiment of the present invention.

FIG. 6 is a flow diagram illustrating controlling a whitening function depending on a CINR in a receive end of according to another embodiment of the present invention.

Referring to FIG. 6, in step 601, the receive end identifies if a signal is received from a transmit end.

If the signal is received from the transmit end, in step 603, the receive end calculates a CINR for the receive signal.

After measuring the CINR, the receive end proceeds to step 605 and compares the CINR calculated in step 603 with a threshold CINR ($CINR_{Th}$) in order to determine if there is interference.

If the CINR calculated in step 603 is less than or equal to the threshold CINR ($CINR_{Th}$), the receive end recognizes that there is interference. Accordingly, the receive end proceeds to step 607 and sets an $R_{nn}$ update variable (k) to a value less than a threshold value.

Then, the receive end proceeds to step 609 and calculates a covariance matrix ($R_{nn}$) of noise plus interference.

On the other hand, if the CINR calculated in step 603 is greater than the threshold CINR ($CINR_{Th}$), the receive end recognizes that there is no interference. Accordingly, the receive end proceeds to step 615 and sets the $R_{nn}$ update variable (k) to a value greater than the threshold value.

Then, the receive end proceeds to step 609 and calculates a covariance matrix ($R_{nn}$) of noise plus interference.

After calculating the covariance matrix ($R_{nn}$) of noise plus interference, the receive end proceeds to step 611 and updates the covariance matrix ($R_{nn}$) using the $R_{nn}$ update variable (k) that is set in step 607 or step 615. For example, the receive end updates the $R_{nn}$ as given in Equation (6).

After updating the $R_{nn}$, the receive end proceeds to step 613 and calculates a pre-whitening inverse matrix (L) through Cholesky Factorization of the $R_{nn}$ updated in step 611. For example, when there is no interference and thus the $R_{nn}$ update variable (k) is set to a value greater than the threshold value, the $R_{nn}$ approaches a unit matrix because diagonal elements of the $R_{nn}$ are relatively greater than off-diagonal elements. In this case, even the pre-whitening inverse matrix (L) becomes a unit matrix and thus, the receive end turns OFF a whitening function of a whitening MRC and receives a signal in an MRC scheme. As another example, when there is interference and thus the $R_{nn}$ update variable (k) is set to a value less than the threshold value, the $R_{nn}$ does not vary. Accordingly, the receive end can turn ON the whitening function of the whitening MRC and receive a signal in an MMSE scheme.

After that, the receive end terminates the procedure according to the embodiment of the present invention.

The present invention has an advantage of being capable of improving a reception performance of a receive end by selectively using an MMSE scheme or an MRC scheme depending on the existence or absence of inter-cell interference in the receive end of a multiple antenna system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a whitening function of a whitening Maximum Ratio Combining (MRC) in a receive end of a multiple antenna system, the method comprising the steps of:
   identifying if there is interference from at least one neighbor cell, according to a comparison of a measured interference power of a received signal with a threshold interference power;
   if there is interference, generating a weight of the whitening MRC using a pre-whitening inverse matrix; and
   if there is no interference, generating a weight of the whitening MRC using a unit matrix.

2. The method of claim 1, wherein identifying if there is interference comprises:
   measuring the interference power using the received signal; comparing the interference power with the threshold interference power; and
   identifying if there is interference from the neighbor cell based on the comparison.

3. The method of claim 2, wherein measuring the interference power comprises:
   measuring power of a combination of noise and interference using a pilot included in the receive signal;
   measuring a power of at least one unused tone;
   removing the power of the at least one unused tone from the power of the combination of noise and interference; and
   identifying the interference power.

4. The method of claim 1, wherein the pre-whitening inverse matrix is generated through Cholesky Factorization of a covariance matrix of noise plus interference.

5. An apparatus for controlling a whitening function of a whitening Maximum Ratio Combining (MRC) in a receive end of a multiple antenna system, the apparatus comprising:
   at least one antenna;
   an interference identifier for identifying if there is interference from at least one neighbor cell, according to a comparison of a measured interference power of a signal received through the at least one antenna with a threshold interference power;
   a filter controller for, if there is interference, providing a pre-whitening inverse matrix to a pre-whitening filter and, if there is no interference, providing a unit matrix to a pre-whitening filter; and
   the pre-whitening filter for generating a weight of the whitening MRC using the pre-whitening inverse matrix or unit matrix provided from the filter controller.

6. The apparatus of claim 5, wherein the interference identifier removes power of at least one unused tone from a power of a combination of noise and interference measured using a pilot included in the receive signal, and identifies an interference power.

7. The apparatus of claim 5, wherein, if there is interference, the filter controller provides a pre-whitening inverse matrix, which is generated through Cholesky Factorization of a covariance matrix of noise plus interference, to the pre-whitening filter.

8. A method for controlling a whitening function of a whitening Maximum Ratio Combining (MRC) in a receive end of a multiple antenna system, the method comprising the steps of:
   identifying whether there is interference from at least one neighbor cell, according to a comparison of a calculated Carrier to Interference plus Noise Ratio (CINR) of a received signal with a threshold CINR;
   generating, if there is interference, a weight of the whitening MRC using a pre-whitening inverse matrix; and
   generating, if there is no interference, a weight of the whitening MRC using a unit matrix.

9. The method of claim 8, wherein identifying whether there is interference comprises:
   calculating the CINR using the received signal;
   comparing the CINR with the threshold CINR; and
   identifying whether there is interference from the neighbor cell based on the comparison.

10. An apparatus for controlling a whitening function of a whitening Maximum Ratio Combining (MRC) in a receive end of a multiple antenna system, the apparatus comprising:
    at least one antenna;
    an interference identifier for identifying whether there is interference from at least one neighbor cell, according to a comparison of a calculated Carrier to Interference plus Noise Ratio (CINR) of a received signal with a threshold CINR;
    a filter controller for providing, if there is interference, a pre-whitening inverse matrix to a pre-whitening filter, and providing, if there is no interference, a unit matrix to a pre-whitening filter; and
    the pre-whitening filter for generating a weight of the whitening MRC using the pre-whitening inverse matrix or unit matrix provided from the filter controller.

* * * * *